No. 661,006. Patented Oct. 30, 1900.
E. WHALLEY.
RUNNING GEAR FOR TRUCKS.
(Application filed May 9, 1900.)

(No Model.)

Witnesses:
J. H. Garfield
H. I. Clemons

Inventor:
Enoch Whalley
by Chapin & Co.
Attorneys.

THE NORRIS PETERS CO., PHOTO-LITHO., WASHINGTON, D. C.

UNITED STATES PATENT OFFICE.

ENOCH WHALLEY, OF WILLIMANSETT, MASSACHUSETTS, ASSIGNOR OF ONE-HALF TO CHARLES H. CURRAN, OF HOLYOKE, MASSACHUSETTS.

RUNNING-GEAR FOR TRUCKS.

SPECIFICATION forming part of Letters Patent No. 661,006, dated October 30, 1900.

Application filed May 9, 1900. Serial No. 16,062. (No model.)

*To all whom it may concern:*

Be it known that I, ENOCH WHALLEY, a citizen of the United States of America, residing at Willimansett, in the county of Hampden and State of Massachusetts, have invented new and useful Improvements in Running-Gear for Trucks, of which the following is a specification.

This invention relates to hand-trucks, and has for its object the improvement of the construction of the running-gear for such trucks, whereby they may be more easily handled than when supported on the running-gear as at present constructed.

The various novel features of the construction in which the invention resides will be fully set forth in the following specification and made to appear clearly in the claims which will form a part thereof.

Figure 1:
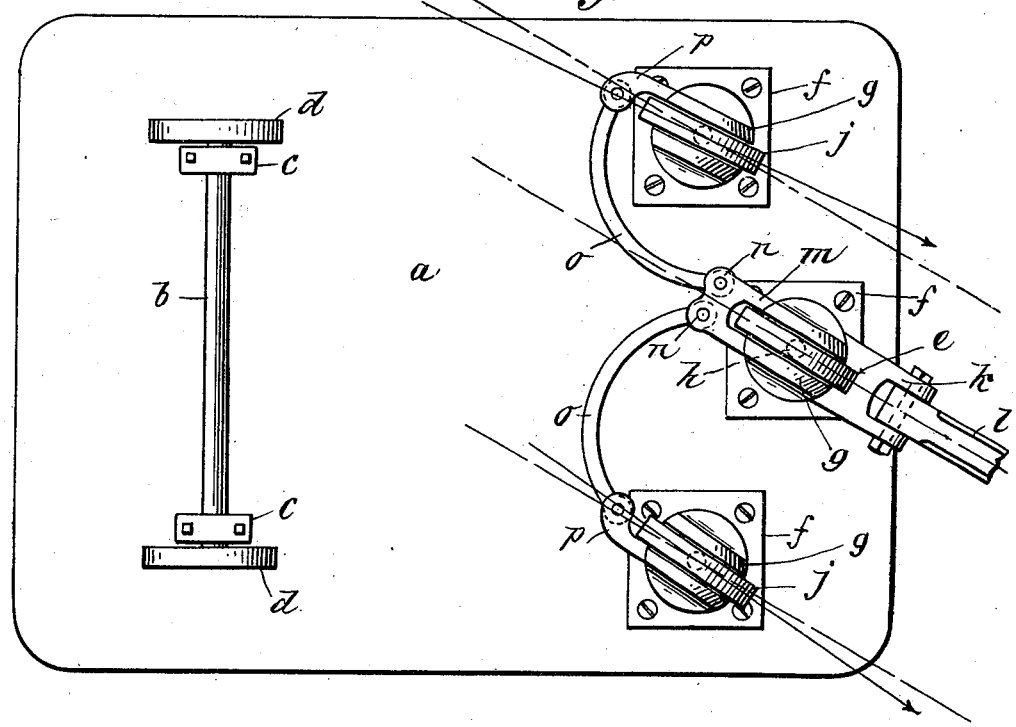
Figure 2:
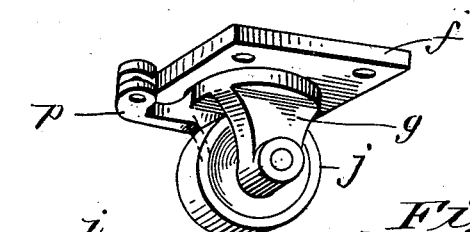
Figure 3:
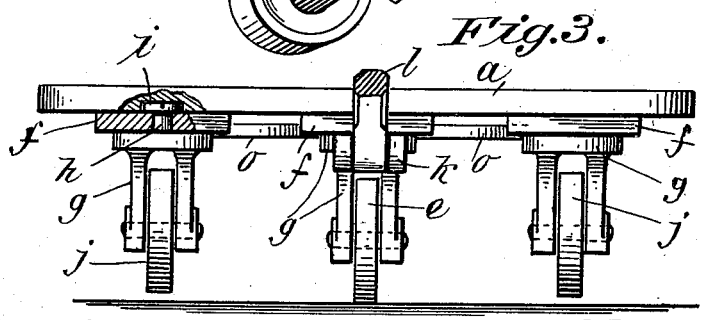

In the accompanying drawings, Figure 1 is a bottom plan view of a truck the running-gear of which embodies this invention. Fig. 2 is a perspective view of one of the truck-wheels. Fig. 3 is a front elevation of the truck.

It is well known that a three-wheel truck is much more easily handled than a four-wheel truck. It is also well known that the three-wheel truck is under heavy loads liable to capsize, or partially so, in making the short turns which are frequently necessary in mills and warehouses.

The objects of this invention are to provide a running-gear for trucks which shall combine the ease of operation of the three-wheel with the stability and consequent carrying capacity of the four-wheel truck, and also to provide means for swiveling the wheels on one end of the truck in such manner that the plane of said wheels shall be substantially tangent to the circles which they describe when the truck is being turned to the right or to the left.

Having these ends in view, I provide the truck-platform $a$ with a rear axle $b$, supported in bearings $c$ near one end thereof in the usual manner, on which are secured the wheels $d$. At the front end of the truck, substantially midway between the said wheels $d$, is the front wheel $e$, which, thus located, is substantially equidistant from each of said wheels $d$. The diameter of said wheels $d$ and $e$ is the same.

The front wheel $e$ is mounted on a plate $f$, secured to the platform $a$ in such manner as to swivel thereon in a horizontal plane. The particular manner of supporting the wheel $e$ on its plate to provide for said swiveling movement is unimportant. It may be effected in the manner shown in the drawings, (see the sectional view at the left-hand side of Fig. 3,) wherein the standard $g$, in which the wheel is hung, may have a central stud $h$, which is stepped in a socket in the plate $f$. A screw $i$ enters the upper end of the stud $h$, the head of said screw being larger than the stud, so that it holds the standard in position on the plate $f$.

On each side of the front wheel $e$ are located the wheels $j\,j$, which are supported on the plate $f$ in the same manner as the wheel $e$, but which differ from the latter in that they are of somewhat less diameter or have shorter standards $g$, to the end that normally said two wheels $j\,j$ do not support any part of the load on the truck.

From that part of the standards $g$ of the front wheel $e$ that lies close to the plate $f$ two arms project in opposite directions. The arm $k$ is forked to receive the tongue $l$, and the other arm $m$ has pivotally secured thereto at the points $n\,n$ two curved arms $o\,o$, which extend, respectively, right and left to the standards of the wheels $j$. These latter are provided with arms $p\,p$, to which said arms $o$ are pivotally attached, as shown. The points $n\,n$, at which the arms $o$ are attached to the arm $m$, are located one on each side of the center of the front wheel $e$ and at equal distances from the axis of said wheel. Because of this construction of the arms $o$ and the arms through which the wheel $e$ and the wheels $j\,j$ are operated it happens that when the tongue $l$ is swung to the right or to the left to guide the truck that one of the wheels $j$ toward which the tongue swings will have a greater rotation of movement imparted thereto than the other of said wheels, and the degree of difference of this rotational movement is so proportioned as to adapt each wheel to "track" properly substantially on the circles which the wheels would describe if the truck were swung from a fixed center. The wheels $j$ only come into play when in turning sharply the load on the truck may cause it to tip either to the right or to the left, and when this happens and one of the wheels $j$ comes to a bearing on the floor the truck becomes practically a four-wheeled truck, and the act of swinging the tongue $l$ to steer the truck one way or the other will impart the proper rotational movement to that one of the wheels $j$ on which the weight will fall if the truck-platform is tipped in effecting a turn, to the end that when said wheel comes to a bearing it will be, as stated, substantially tangent to the circle described by that point of the truck to which this wheel is attached. In consequence of the above-described disposition of the wheels $j$ and $e$ the truck is much more easily handled than would be possible if said wheels $j$ did not assume the position described relative to the circle described by them when the truck is turned from a straight course.

Having thus described my invention, what I claim, and desire to secure by Letters Patent of the United States, is—

1. A truck comprising an axle and wheels thereon across the rear end of the truck, three wheels arranged across the front end of the truck, the center one only of which, together with the rear axle, normally sustains the weight of the truck, substantially as described.

2. A truck comprising an axle and wheels thereon across the rear end of the truck, three wheels adapted to rotate in a horizontal plane arranged across the front end of the truck, and means of connection between them whereby that one of said outside front wheels, toward which the center wheel is moved in turning the truck will have imparted to it a greater degree of rotational movement than the other of said wheels, substantially as described.

3. A truck comprising an axle and wheels thereon across the rear end of the truck, three wheels arranged across the front end of the truck adapted to swing in a horizontal plane, the center one only of which, together with the rear axle, normally sustains the weight of the truck, and means of connection between said three front wheels, whereby when said center wheel is swung to the right or left to change the direction of movement of the truck, that one of the wheels located at the side of said center wheel, which moves on the shortest radius, will have the greatest degree of rotational movement imparted thereto, substantially as described.

ENOCH WHALLEY.

Witnesses:
 WM. H. CHAPIN,
 K. I. CLEMONS.